(12) United States Patent
Starr et al.

(10) Patent No.: US 8,352,768 B2
(45) Date of Patent: Jan. 8, 2013

(54) CONTROLLING POWER STATES OF A PERIPHERAL DEVICE IN RESPONSE TO USER PROXIMITY

(75) Inventors: Robert Starr, Decatur, GA (US); Jerry Liu, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 910 days.

(21) Appl. No.: 11/796,401

(22) Filed: Apr. 27, 2007

(65) Prior Publication Data

US 2008/0270814 A1    Oct. 30, 2008

(51) Int. Cl.
G06F 1/00 (2006.01)
(52) U.S. Cl. .......................... 713/323; 713/300
(58) Field of Classification Search .................. 713/300, 713/320, 323
See application file for complete search history.

(56) References Cited

U.S. PATENT DOCUMENTS

| | | | | |
|---|---|---|---|---|
| 5,991,827 | A * | 11/1999 | Ellenby et al. ................ | 710/8 |
| 6,260,111 | B1 * | 7/2001 | Craig et al. ................... | 711/115 |
| 6,563,430 | B1 * | 5/2003 | Kemink et al. ............. | 340/825.49 |
| 6,874,091 | B2 * | 3/2005 | Min ............................. | 713/300 |
| 6,987,454 | B2 * | 1/2006 | Narayanaswami et al. ........................ | 340/572.1 |
| 7,249,269 | B1 * | 7/2007 | Motoyama .................... | 713/320 |
| 2003/0051181 | A1 * | 3/2003 | Magee et al. ................ | 713/320 |
| 2004/0032605 | A1 * | 2/2004 | Regimbal .................... | 358/1.13 |
| 2005/0094610 | A1 * | 5/2005 | de Clerq et al. ............. | 370/338 |
| 2007/0037547 | A1 * | 2/2007 | Cheol ......................... | 455/343.1 |
| 2008/0005599 | A1 * | 1/2008 | Theocharous et al. ........ | 713/300 |
| 2008/0181172 | A1 * | 7/2008 | Angelhag et al. ............ | 370/328 |
| 2008/0238661 | A1 * | 10/2008 | Camp et al. ............. | 340/539.21 |

* cited by examiner

*Primary Examiner* — Paul Yanchus, III
*Assistant Examiner* — Brandon Kinsey
(74) *Attorney, Agent, or Firm* — Myers Bigel Sibley & Sajovec, P.A.

(57) ABSTRACT

In a method of controlling the power state of a peripheral device, the peripheral is changed from a first power state to a second power state in response to communications across a network connected to the peripheral indicating that a user is proximately located to the peripheral. A user may be determined to be proximately located to the peripheral by monitoring communications across the network to detect traffic that is associated with a user logging onto a computer that can utilize the peripheral, by discovering a wireless terminal that is associated with a user and which is proximately located to the peripheral, by receiving information from a cellular communication network across the network that indicates that a user of the peripheral is proximately located to the peripheral, and/or in response to a time of day and/or day of week/month schedule.

17 Claims, 5 Drawing Sheets

CONTROLLING POWER STATES OF A PERIPHERAL DEVICE IN RESPONSE TO USER PROXIMITY

FIELD OF THE INVENTION

The present invention relates to networked computer systems and, more particularly, to controlling the power state of one or more networked peripherals.

BACKGROUND OF THE INVENTION

Continued technology advancements have provided an increasing proliferation of the various types and numbers of peripheral devices that can be networked to a computer. Such peripheral devices can include printers, photocopiers ("copiers"), video recording devices (e.g., digital video recorders), audio recording devices (e.g., MP3 recorders), televisions and other audio/video devices. Because of the number of peripherals that a user may utilize from time-to-time, the peripherals may be left powered-on between use and may even be left powered-on during long periods of non-use, such as overnight and throughout weekends. Because some peripherals consume relatively large amounts of power while operating and their operational life is reduced while powered-on, some peripheral devices automatically transition from a higher power operational state to a lower power sleep state after a defined duration of non-use.

For example, laser printers and copiers typically employ high temperature fuser assemblies to permanently adhere toner to paper. The heating elements that warm the fuser assemblies can consume substantial electrical energy and, therefore, powering the heater elements whenever a laser printer/copier is turned on but idle can be wasteful.

It has generally been known to cause some types of peripherals, such as printers and copiers, to enter a power save mode after a certain period of inactivity. For instance, after a period of about one hour of non-use, a printer or copier may transition from a higher power operational state to a lower power sleep state in which their fuser assemblies (heater elements) are powered-off. Depending on the particular printer/copier, the warm-up period for the fuser assembly may range from one to several minutes or more. This warm-up period may be considered unsatisfactory to a user who, for example, has sent a print job to a printer/copier and is now idly standing by the printer/copier awaiting completion of the print job.

SUMMARY OF THE INVENTION

Some embodiments of the present invention provide a method of controlling the power state of a peripheral device. The method includes changing the peripheral from a first power state to a second power state in response to communications across a network connected to the peripheral indicating that a user is proximately located to the peripheral.

In some further embodiments, communications across the network may be monitored to detect traffic that is associated with a user logging onto a computer that can utilize the peripheral, and the user may be determined to be proximately located to the peripheral based thereon. When the peripheral is in the first power state, the peripheral may be changed to the second power state in response to detecting network traffic associated with the user logging onto the computer.

In still some further embodiments, the network may include a Bluetooth wireless network and/or a wireless local area network. A wireless communication terminal that is proximately located to the peripheral may be discovered in response to the peripheral receiving communications across the Bluetooth network and/or across the wireless local area network from the wireless terminal. When the peripheral is in the first power state, the peripheral may be changed to the second power state in response to the discovery of the wireless terminal.

In some further embodiments, the peripheral may receive information from a cellular communication network across the network that indicates that one or more users of the peripheral are proximately located to the peripheral. When the peripheral is in the first power state, the peripheral may be changed to the second power state in response to the received information.

In some further embodiments, the power state of the peripheral may be controlled in response to a time of day and/or day of week/month schedule.

Other methods, computer program products, and/or related systems according to embodiments of the invention will be or become apparent to one with skill in the art upon review of the following drawings and detailed description. It is intended that all such additional methods, computer program products, and/or related systems be included within this description, be within the scope of the present invention, and be protected by the accompanying claims.

DETAILED DESCRIPTION

Figure 1:
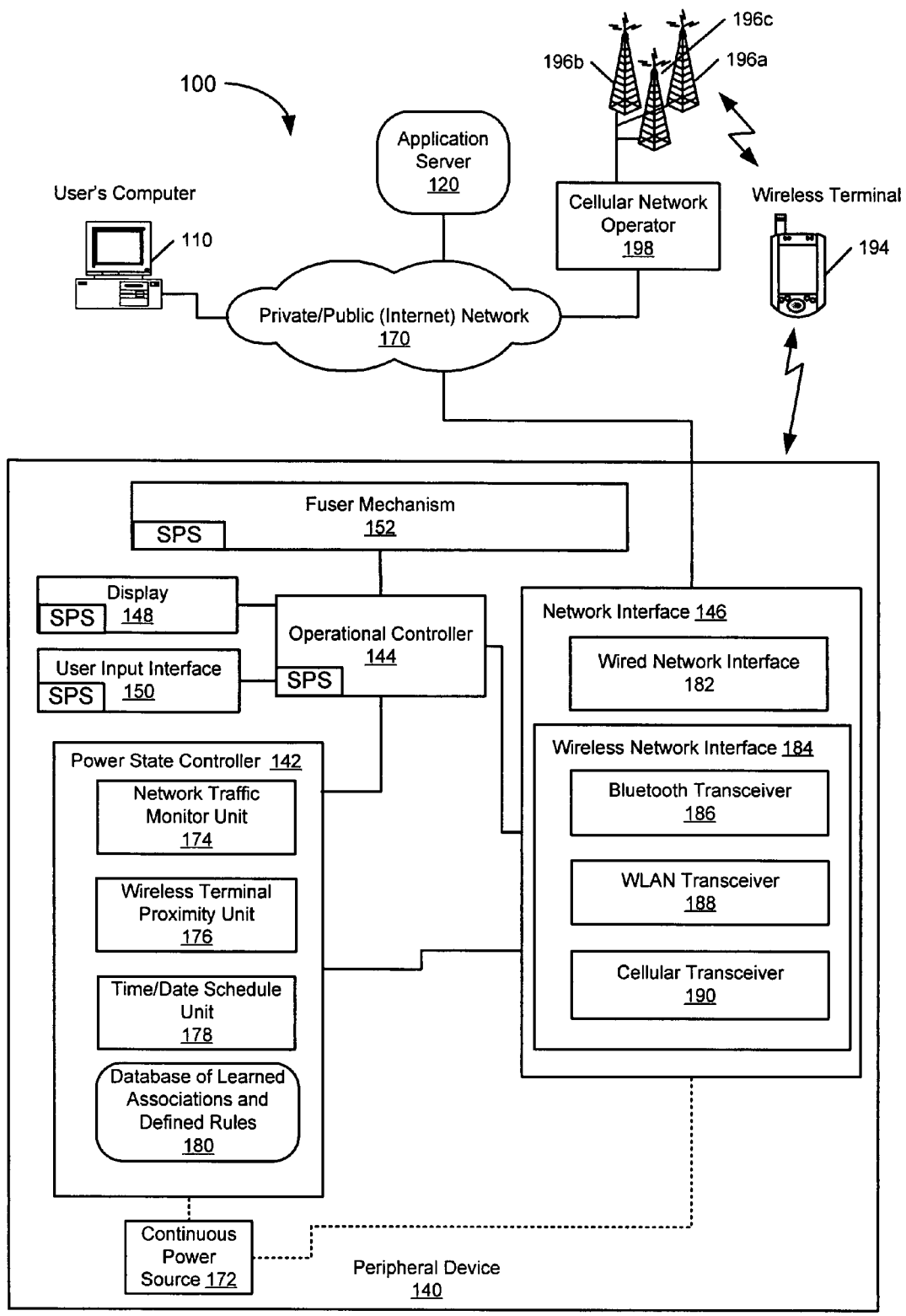
FIG. 1 is a block diagram that illustrates a communication system in which a peripheral device controls its power state in response to communications across a network indicating whether a user is proximately located to the peripheral and/or in response to other defined events in accordance with some embodiments of the present invention, and further illustrates corresponding methods thereof.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise.

It also will be understood that, as used herein, the term "comprising" or "comprises" is open-ended, and includes one or more stated elements, steps and/or functions without precluding one or more unstated elements, steps and/or functions. As used herein the term "and/or" and "/" includes any and all combinations of one or more of the associated listed items. It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

Some non-limiting exemplary embodiments of the present invention may be embodied as apparatus, methods, and/or computer program products. Accordingly, the present invention may be embodied in hardware and/or in software (including firmware, resident software, micro-code, etc.). Thus, for example, the term "controller" may include, but is not limited to discrete hardware logic (e.g., gate array) and/or a microprocessor and associated software that are configured to carry out at least some of the functions described herein.

Furthermore, exemplary embodiments of the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams and/or operational illustrations of apparatus, methods, and computer program products according to exemplary embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

In accordance with some embodiments of the present invention, the power state of a peripheral device is changed from a lower power state to a higher power state in response to certain events that are indicative of a user being proximately located to the peripheral. For example, the peripheral device may be changed from the lower power state to the higher power state in response to observing network traffic that is associated with a user logging onto a computer that is associated with the peripheral and/or in response to observing other defined network traffic. Alternatively or additionally, the peripheral device may be changed to the higher power state in response to the peripheral device and/or a centralized peripheral controller discovering that a wireless terminal, which is associated with the user, is within a threshold distance of the peripheral device, and/or in response to receiving user location information via a network that indicates that the user is proximately located to the peripheral. Alternatively or additionally, the peripheral device may be changed to the higher power state in response to a defined schedule. These and other embodiments are now described below with reference to FIGS. 1-5.

Figure 2:
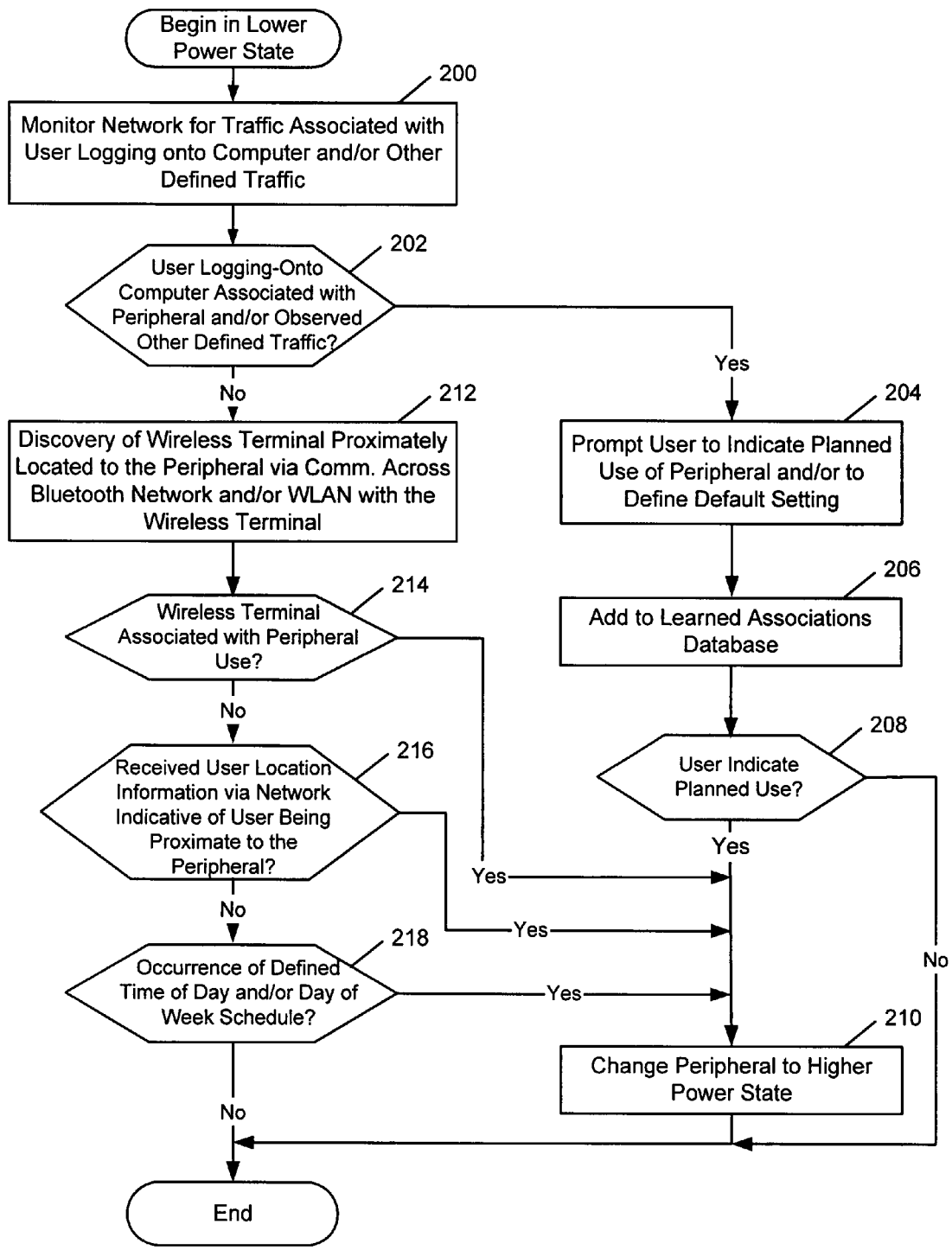
FIG. 2 is a flow chart that illustrates operations for changing the power state of a peripheral in response to monitored network traffic, discovery of a wireless terminal, receipt of a user location that is proximate to the peripheral, and/or in response a defined schedule in accordance with some embodiments of the present invention.

FIG. 1 is a block diagram that illustrates a communication system 100 that includes one or more computers 110, one or more application servers 120, one or more peripheral devices 140, and a private/public (e.g., Internet) network 170. FIG. 2 is a flow chart that illustrates operations for raising the power state of the peripheral 140. The network 170 communicatively interconnects the computer 110, application server 120, and the peripheral 140.

For purposes of illustration and explanation only, the peripheral 140 is described as a printer/copier device, however the peripheral 140 is not limited thereto and can include, but is not limited to, a printer, a copier, a video recording device (e.g., digital video recorder), an audio recording device (e.g., MP3 recorder), a display device, another audio/video device, a tape data storage device, a hard disk data storage device, another mass data storage device, computer controlled assembly/manufacturing machinery, and/or another device that is connectable to a communication network and can operate in at least two different power states (e.g., powered-off, one or more different power level sleep states, and one or more different power level operational states).

The peripheral 140 may include a power state controller 142, an operational controller 144, a network interface 146, a display 148, a user input interface 150 (e.g., touch screen device, . . . ), and, when configured as a printer/copier, may include a fuser mechanism 152. The network interface 146 interconnects the peripheral 140 to the computer 110 and to application server 120 through the network 170 and/or through one or more wireless communications networks. The operational controller 144 can be configured to control the network interface 146, the display 148, the user input interface 150, and the fuser mechanism 152 to provide conventional printing and/or copier functionality, as is well known in the art.

In accordance with some embodiments, the power state controller 142 is configured to control the flow of power to one or more elements of the peripheral 140, so as to change the peripheral from a first power state to a second power state, such as between a lower power sleep state and a higher power operational state in response to various defined events. The fuser mechanism 152, the operational controller 144, the display 148, and/or the user input interface 150 may include switchable power supply ("SPS") circuitry which is controlled by the power state controller 142 to selectively supply power and inhibit the supply of power to the associated components 152, 144, 148, and/or 150.

Thus, for example, the power state controller 142 may place the peripheral 140 in a lower-power sleep state by controlling the SPS circuitry to power off the fuser mechanism 152, the operational controller 144, the display 148, and at least a portion of the user input interface 150. The power state controller 142 may respond to signals from the network interface 146, which are indicative of the user being proximately located to the peripheral 140, and/or respond to a defined schedule by controlling the SPS circuitry to power on the fuser mechanism 152, the operational controller 144, the display 148, and the user input interface 150 so as to place the peripheral 140 in a higher power operational state in which it can carry out, for example, printing/copier functionality. Accordingly, the power state controller 142 and a network interface 146 can be connected to a continuous power source 172, which can provide power to the power state controller and to the network interface 146 while the peripheral 140 is in the lower-power sleep state.

The power state controller 142 may include a network traffic monitor unit 174, a wireless terminal proximity unit 176, a time/date schedule unit 178, and a database of learned associations and defined rules 180. The network interface 146 may include a wired network interface component 182 and a wireless network interface 184. The wired network interface component 182 may be configured to communicate across, for example, a digital subscriber telephone line (DSL), a digital cable (e.g., cable TV line), and/or other wired data communication lines such as residential/business power lines. The wireless network interface 184 may include Bluetooth transceiver 186, a WLAN transceiver 188, and/or a cellular transceiver 190.

Although the exemplary power state controller 142 is shown in being within the peripheral device 140, it is not limited thereto and may be at least partially external to the peripheral device. For example, the computer 110 connected to one or more peripheral devices may be configured to carry out at least some of the power state control functionality described herein for those peripheral devices. The computer 110 may monitor what applications hosted by the computer and/or application server 120 are executed by the user, and may control the power states of the peripheral 140 and/or other peripheral in response thereto. The computer 110 may selective among a plurality of peripheral devices based on which application(s) are being executed by the user. For example, the computer 110 may selectively wake-up a monochrome laser printer in response to the user running a word processing application, wake-up a color laser/inkjet printer in response to the user running a picture editing application, and/or wake-up a large format paper printer in response to the user running a drawing application.

With further reference to FIG. 2, the network traffic monitor unit 174 monitors communications (Block 200) between the computer 110 and the application server 120 and/or other networked devices to detect traffic that is associated with a user logging onto the computer 110 (or another networked device) and/or to detect other defined traffic which is indicative of a user being proximately located to the peripheral 140. The network traffic monitor unit 174 may monitor network traffic through the wired network interface 182, when the peripheral 140 is connected to the computer 110 via the network 170, and/or through the wireless network interface 184, when the peripheral 140 is connected to the computer 110 via a wireless network. The network traffic monitor unit 174 may further determine (Block 202) whether a user who has been observed, via monitored network traffic, logging onto the computer 110 is associated with the peripheral 140, such as by identifying that the user is listed among a group of users who have been granted access privileges to the peripheral 140 and/or is determined to have previously used the peripheral 140.

In response to detecting such defined traffic, the power state controller 142 may communicate a message (Block 204) to the computer 110, such as via an e-mail or instant message, which prompts the user to indicate whether the user intends to use the peripheral 140 and/or to indicate whether the peripheral 140 is instructed to, in the future, remain in and/or change to a defined power state when the peripheral 140 observes the user logging onto the computer 110. The peripheral 140 may add (Block 206) the learned association, of the user logging onto the computer 110 and the user's intent to use the peripheral 140, to the database of learned associations and define rules 180 in the power state controller 142. The peripheral 140 may respond to a response (Block 208) from the user by remaining in a first power state (e.g., the lower power sleep state) or changing the peripheral to a second power state (e.g., the higher power operational state) (Block 210).

Accordingly, the peripheral 140 may monitor network traffic to determine when a user has arrived at work by detecting network traffic that is associated with the user logging onto a computer and/or other traffic is associated with user being at work. The peripheral 140 may identify the user and, when the user is expected to use the peripheral near-term, the peripheral 140 may switch to a higher power operational stage in anticipation of receiving one or more commands from the user.

Alternatively or additionally, the computer 110, which the user logs into, may prompt the user to indicate whether the user intends to use the peripheral 140 and/or other defined peripheral, and may control the power states of the peripherals based on the user's response. Accordingly, upon logging into the computer 110, the peripheral 140 and/or other peripherals may be triggered to change from a sleep state to an operational state to prepare for one or more commands (e.g., print jobs) from the user.

The peripheral 140 may more directly sense that a user has come within a threshold distance of the peripheral 140 by discovering that a wireless terminal 194, which may be carried by the user or otherwise turned on by the user after arriving at a location, is now within a communication range of the peripheral 140. Accordingly, when the user arrives at work, the peripheral 140 may sense the user's presence by discovering the presence of the wireless terminal 194 which is associated with the user. The peripheral 140 may then switch to a higher power operational state in anticipation of receiving one or more commands from the user.

The Bluetooth transceiver 186 and the WLAN transceiver 188, in the wireless network interface 184, may be configured to discover that the wireless terminal 194, which may be configured to communicate via a Bluetooth network and/or a WLAN network, has come within communication range of the Bluetooth transceiver 186 (e.g., within tens of feet thereof) and/or of the WLAN transceiver 188 (e.g., within hundreds of feet thereof). The Bluetooth transceiver 186 and the WLAN transceiver 188 (e.g, a IEEE 801.11a-g compliant device) may operate in a conventional manner to discover the wireless terminal 194 and may further operate to establish a communication network therewith. The peripheral 140 may additionally/alternatively detect the user's presence by sensing a RF identification (RFID) transmitter (via near-field communications) on the user (e.g., within the user's employee ID card).

The wireless terminal proximity unit 176 may respond (212) to discovery of the wireless terminal 194 being within communication range of the peripheral 140 by determining (Block 214) whether the wireless terminal 194 is associated with use of the peripheral 140. For example, the wireless terminal proximity unit 176 may identify the wireless terminal 194 as being associated with a user who is among a list of users who are allowed access privileges to the peripheral 140 and/or as being associated with a user who has previously used the peripheral 140, which may be learned by observing previous use of the peripheral 140 within a threshold time of discovering the wireless terminal 194. In response to the determination (Block 214), the power state controller 142 can change the peripheral 140 to the second power state (e.g., the higher power operational state) (Block 210).

Although the exemplary wireless terminal proximity unit 176 is illustrated as being within the peripheral 140, it may alternatively/additionally be located outside the peripheral device 140 (e.g., near entrances to a business) and be networked to the peripheral 140.

The peripheral 140 may be told when the wireless terminal 194 has become proximately located thereto. For example a cellular network operator 198 may track the location of the wireless terminal 194 and, when the wireless terminal 194 becomes within a defined region (e.g., arrived at a defined workplace of the user), the cellular network operator 198 may send a message, via the network 170 and/or via the cellular transceiver 190, to the peripheral 140 indicating that the user is proximately located to the peripheral 140.

The cellular network operator 198, the wireless terminal 194, and the cellular transceiver 190 of the peripheral 140 may communicate over a wireless interface, via one or more of the base stations 196a-c, using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS). As used herein, a "wireless terminal" includes, but is not limited to, a communication device that may transmit and receive communication signals via a short range wireless air interface, such as a Bluetooth wireless interface and/or a wireless WLAN interface (e.g., IEEE 801.11a-g), and/or via a cellular air interface using one or more cellular communication protocols. A wireless terminal may include, but is not limited to, a cellular phone and/or data terminal, a personal data assistant (PDA), a mobile or fixed computer (e.g., laptop computer, palmtop computer, desktop computer), and/or another device that is configured to communicate radio frequency signals over a wireless interface.

The wireless terminal 194 may determine its location based on GPS signals from a constellation of GPS satellites and/or based on triangulation of radio communication signals received from the plurality of cellular base stations 196a-c. The wireless terminal 194 may therefore determine when it has become within the defined region. The wireless terminal proximity unit 176 may then notify the peripheral 140 when the user is proximately located to the peripheral 140 based on that determination.

The cellular network operator 198 may determine the location of the wireless terminal 194 by triangulation of radio communication signals received by the cellular base stations 196a-c from the wireless terminal 194 and/or by receiving from the wireless terminal 194 its own determined location. The cellular network operator 198 may use that location to determine when the wireless terminal 194 is within a defined region and, responsive thereto, may send a message to the peripheral 140 that indicates that a defined user is proximately located to the peripheral 140.

Accordingly, the peripheral 140 may use the user location information (Block 216) received via the wired network interface 182 and/or the wireless network interface 184 to determine that a user is proximately located to the peripheral 140. The power state controller 142 may respond to the received location information by changing the peripheral 140 to the second power state (Block 210).

The schedule unit 178 of the power state controller 142 may contain a schedule that defines a time of day and/or the day of week/month when the power state controller 142 is to control the power state of peripheral 142 to be in the first power state or the second power state. The schedule unit 178 may therefore control the peripheral 140 to be in the second/first power state by powering-up/powering-down the fuser mechanism 152, the operational controller 144, the display 148, and/or the user interface 150 upon occurrence of a defined time of day and/or day of week/month.

Figure 3:
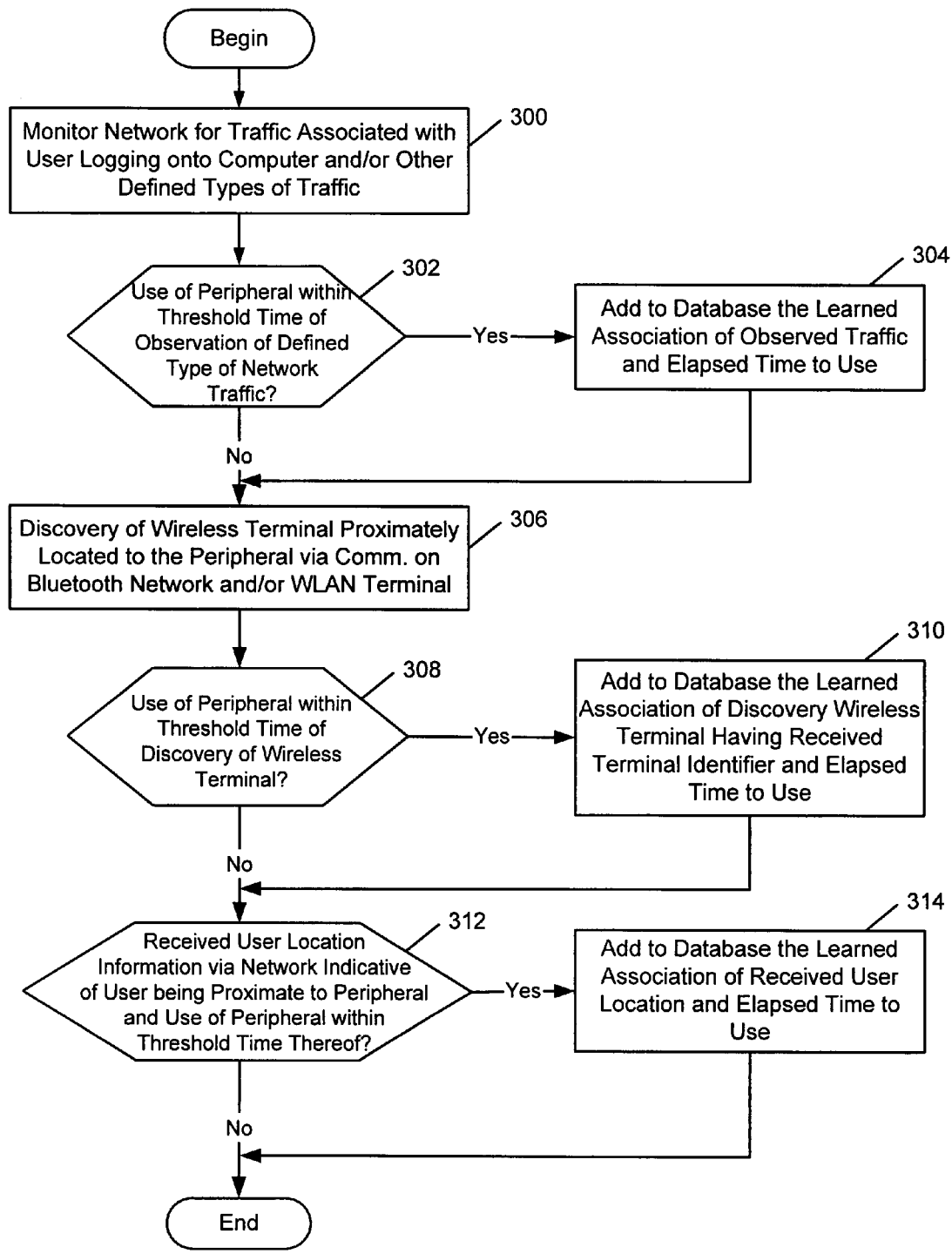
FIG. 3 is a flow chart that illustrates operations for developing a database of learned associations between use of a peripheral and observation of certain types of network traffic, discovery of a wireless terminal, and/or receipt of a user location that is proximate to the peripheral in accordance with some embodiments of the present invention.

As briefly mentioned above and now described in further detail below, the power state controller 142 may utilize the database of learned associations and defined rules 180 to control the power state of the peripheral 140 based on various events that are observed or otherwise defined therein. FIG. 3 is a flow chart that illustrates operations for developing a database of learned associations between use of a peripheral (e.g., peripheral 140) and observation of certain types of network traffic, discovery of a wireless terminal (e.g., wireless terminal 194), and/or receipt of a user location that is proximate to the peripheral in accordance with some embodiments of the present invention.

Referring to FIG. 3, the network traffic monitor unit 174 monitors communications (Block 300) on the network 170 and/or on one or more wireless networks (e.g., via the Bluetooth transceiver 186, the WLAN transceiver 188, and/or the cellular transceiver 190) to identify traffic between the computer 110 and application server 120 that is associated with a user logging onto the computer 110 and/or other defined types of traffic. The other defined types of traffic may include, but are not limited to, observing a print command is communicated through the monitored network to another peripheral device that is proximately located to the peripheral device 140, and/or operations to load one or more applications from the application server 120 to the computer 110.

The power state controller 142 may learn (Block 302) that when one or more commands are received by the peripheral 140 from a user within a threshold time of observing the user logging onto the computer 110 and/or observing other defined types of traffic on the monitored network is indicative of a cause-effect correlation that is to be added (Block 304) to the database of learned associations and defined rules 180. Accordingly, when the network traffic monitor unit 174 observes that a user has logged onto the computer 110 and within a defined threshold time receives one or more print commands from the computer 110, the network traffic monitor unit 174 may add that learned association (of observing a user logging in and subsequent peripheral use) to the database 180. Furthermore, the network traffic monitor unit 174 may store in the database 180 the elapsed time between observing the network traffic and subsequent use of the peripheral 140. The power state controller 142 may then use the defined association and a present observation of defined network traffic to command the peripheral 140, when it is in a lower power sleep state, to change to a higher power operational state in expectation of receiving a near-term print command from the computer 110. The power state controller 142 may delay changing to the higher power operational state based on the elapsed time that has been previously observed between the network traffic and subsequent use of the peripheral 140.

The wireless terminal proximity unit 176 may associate discovery (Block 306) of the wireless terminal 194 being proximately located to the peripheral 140 with observed use of the peripheral 140 within a threshold time (Block 308) of the discovery of the wireless terminal 194. The wireless terminal proximity unit 176 may add (Block 310) the learned association (of discovering a defined wireless terminal and subsequent use of the peripheral 140) to the database 180. Furthermore, the wireless terminal proximity unit 176 may store in the database 180 the elapsed time between discovering a wireless terminal and subsequent use of the peripheral 140. The power state controller 142 may then respond to discovery of the wireless terminal having an identifier that corresponds to an identifier in the database 180 by commanding the peripheral 140 to change from the lower power sleep state to the higher power operational state in anticipation of receiving a near-term print command, or another peripheral command, from a user, and may delay changing to the higher power operational state based on the elapsed time that has been previously observed between discovery of a wireless terminal and subsequent use of the peripheral 140.

The power state controller 142 may associate user location information that is received through the wired network 170 (e.g., via the wired network interface 182) and/or through a wireless network (e.g., via the wireless network interface 184) with observed use of the peripheral 140 within a threshold time (Block 312) of receiving the user location information. The power state controller 142 may add (Block 314) the learned association to the database 180. The power state controller 142 may then respond to receipt of user location information having an identifier that corresponds to an identifier in the database 180 by commanding the peripheral 140 to change from the lower power sleep state to the higher power operational state in anticipation of receiving a near-term print command, or another peripheral command, from a user.

The power state of a peripheral 140 may similarly be changed from the second power state (e.g., a higher power operational state) to the lower power state (e.g., a lower power sleep state) in response to certain events that are indicative of a user not being proximately located to the peripheral. For example, the peripheral device may be changed from a higher power operational state to a lower power sleep state in response to observing network traffic that is associated with a user logging off the computer 110 and/or in response to observing other defined network traffic. Alternatively or additionally, the peripheral 140 may be changed to the lower power sleep state when the peripheral 140 and/or a centralized peripheral controller discovers that the wireless terminal 194 is no longer within a threshold distance of the peripheral 140, and/or in response to receiving user location information via the network 170 and/or a wireless network that indicates that the user is no longer proximately located to the peripheral 140. Alternatively or additionally, the peripheral 140 may be changed to the lower power sleep state in response to a defined schedule. These and other embodiments are now described below with reference to FIGS. 1 and 4.

Figure 4:
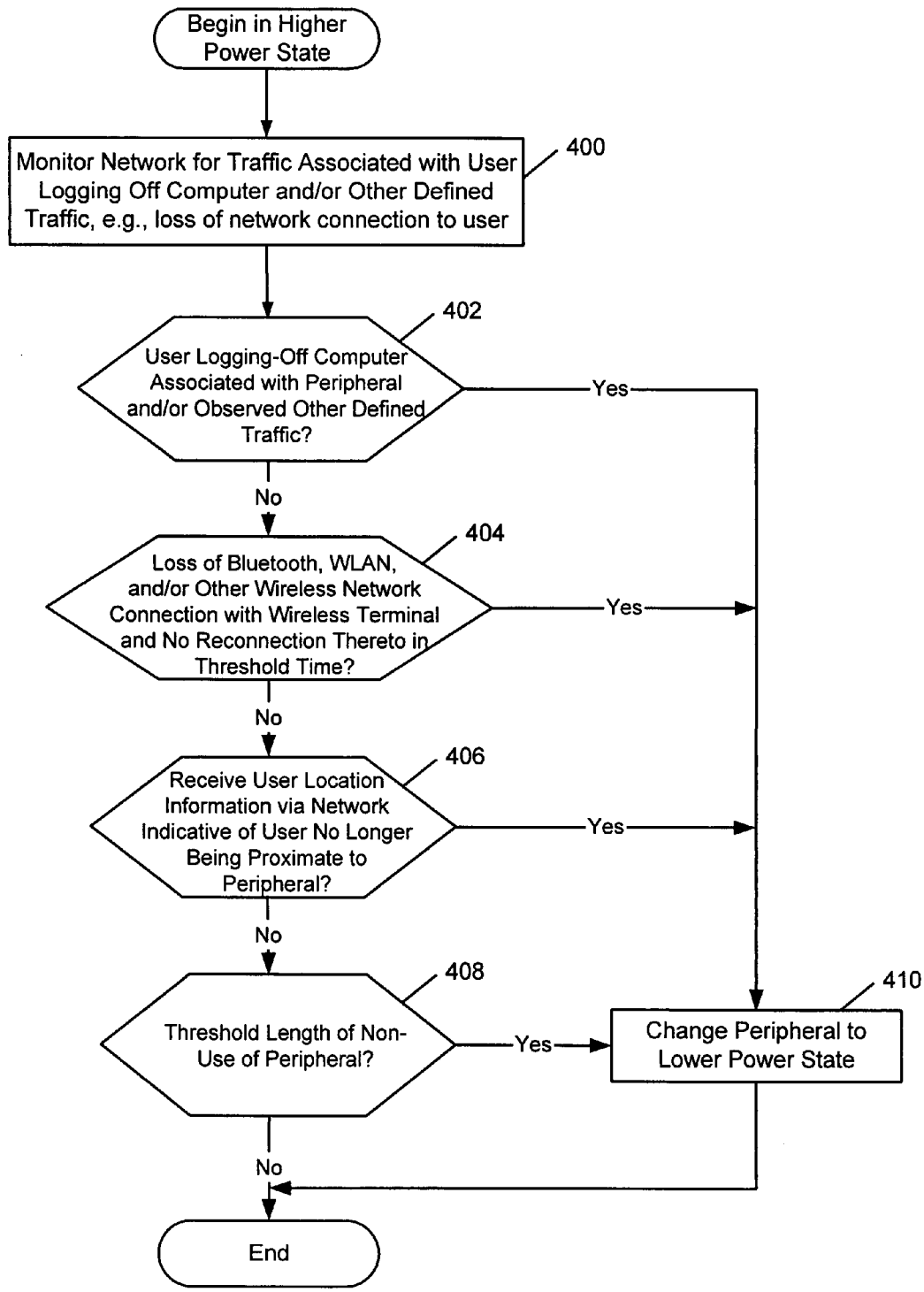
FIG. 4 is a flow chart that illustrates operations for lowering the power state of a peripheral in response to monitored network traffic, loss of network connection to a wireless terminal, receipt of a user location that is not proximate to the peripheral, and/or in response to a defined schedule in accordance with some embodiments of the present invention.

FIG. 4 is a flow chart that illustrates operations that may be carried out by the peripheral 140 to change from a first power state to a second power state, such as from a higher power operational state to lower power sleep state. The network traffic monitor unit 174 monitors communications (Block 400) between the computer 110 and the application server 120 and/or other network devices to detect traffic that is associated with a user logging off of the computer 110 (or another network device) and/or to detect other defined traffic which is indicative of the user leaving the proximity of the peripheral 140. The network traffic monitor unit 174 may further refer to information in the database 180 to determine (Block 402) whether the detected traffic is associated with a user, or a group of users, who is authorized to use the peripheral 140, and may further determine whether any other users of the peripheral 140 are still located proximate to the peripheral 140. When the monitored network traffic indicates that the user is leaving the proximity of the peripheral 140, a further determination may be made as to whether any other defined users remain proximately located to the peripheral 140. When no other users remain proximately located to the peripheral 140, the power state controller 142 may change (Block 410) the power standard of the peripheral 140 to the lower power sleep state.

The wireless terminal proximity unit 176 may respond (404) to a loss of a Bluetooth network connection, WLAN network connection, and/or cellular network connection to the wireless terminal 194 as an indication that the user has left the proximity of the peripheral 140, and may cause the power state controller 142 to change (Block 410) the power state of the peripheral 142 to the lower power sleep state. The power state controller 142 may wait for a defined threshold time following loss of a network connection, to allow the wireless terminal 194 and/or the wireless network interface 24 to reestablish the network connection there between, before changing the power state of the peripheral 140. Accordingly, while a momentary loss of network connection may not cause a change in the power state, a more prolonged loss of network connection can cause a change in the power state of the peripheral 140.

When the peripheral 140 has been placed in the higher power operational state in response to discovering presence of the wireless terminal 194, the power state controller 142 may then change the peripheral 140 back to the lower power sleep state in response to not sensing continued presence of the wireless terminal 194 within a threshold elapsed time. Accordingly, the power state of the peripheral 140 may be changed in response to sensing the presence or loss of presence of the wireless terminal 194 without necessitating establishment of a network connection there between (i.e., without pairing to the terminal 194 through a Bluetooth protocol or negotiating connection to the terminal 194 through a WLAN protocol).

The power state controller 142 may respond (Block 406) to information that indicates that the user is no longer proximately located to the peripheral 140, such as location information received from the cellular network operator 198, by changing the peripheral 140 to the lower power sleep state (Block 410). The power state controller 142 may also respond (Block 408) to a threshold length of non-use of the peripheral 140 by changing the peripheral 140 to the lower power sleep state (Block 410).

Figure 5:
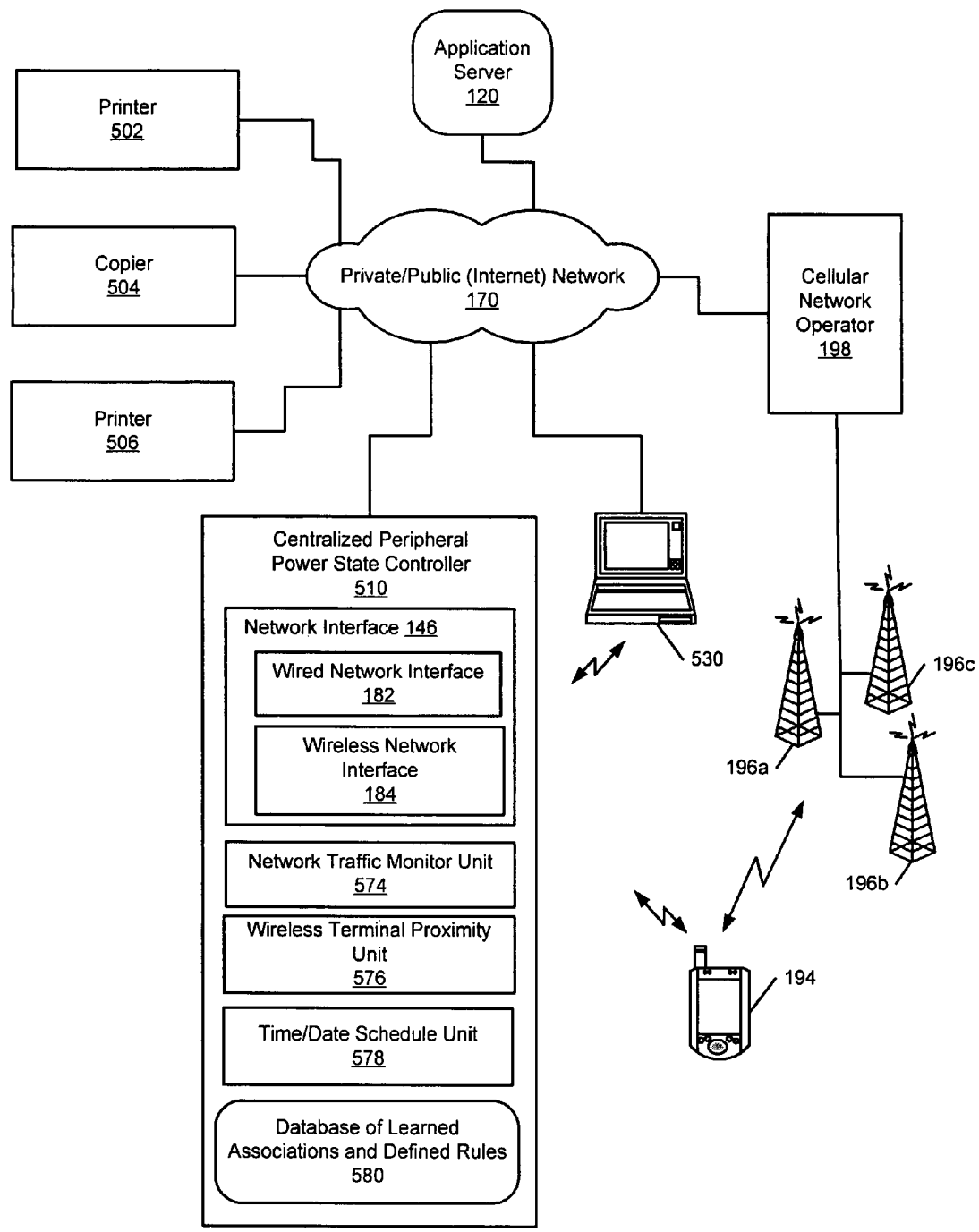
FIG. 5 is a block diagram that illustrates a communication system in which the power state of a peripheral device is controlled by a centralized peripheral power state controller in response to communications across a network indicating whether a user is proximately located to the peripheral and/or in response to other defined events in accordance with some embodiments of the present invention, and further illustrates corresponding methods thereof.

FIG. 5 is a block diagram that illustrates a communication system 500 that includes a plurality of peripherals, illustrated as a printer 502, a copier 504, and a networked consumer product 506, a centralized peripheral power state controller 510, the network 170, the application server 120, the cellular network operator 198, a computer 530 (which may be similarly configured to the computer 110 of FIG. 1), and the wireless terminal 194. The communication system 500 differs from the communication system 100 in that the centralized peripheral power state controller 510 controls the power states of the peripherals, the printer 502, the copier 504, and the networked product 506. The centralized controller 510 may carry out similar functions to those described above for the power state controller 142 in the peripheral 140.

The centralized controller 510 includes the network interface 146, a network traffic monitor unit 574, a wireless terminal proximity unit 576, a time/date schedule unit 578, and/or a database of learned associations and defined rules 580. The network interface 146 may operate in accordance with the description provided above for the network interface 146 of FIG. 1, and may include the wired network interface 182 and/or the wireless network interface 184.

The network traffic monitor unit 574 can be configured in a similar manner to that described for the network traffic monitor unit 174 to monitor communications across the wired network 170 and/or a wireless network (e.g., Bluetooth network, WLAN network, and/or cellular network) to detect traffic that is associated with a user logging onto/off the computer 530 and/or to identify other defined traffic (e.g., as described above with regard to Blocks 200-202 of FIG. 2 and/or Blocks 400-402 of FIG. 4) and to control the power state of one or more of the peripherals 502, 504, and 506.

Accordingly, the centralized controller 510 may detect that a user is logging onto the computer 530, may determine from rules defined in the database 580 that the user typically uses the printer 502 and the copier 504, and may respond thereto by commanding the printer 502 and the copier 504 to change from a lower power sleep state to a higher power operational state in preparation for those peripherals receiving commands from the user. The centralized controller 510 may similarly detect the user is logging off the computer 530, may determine from the database 580 than no other users of the printer 502 and/or the copier 504 remain within a proximate distance to those peripherals (e.g., such as by determining that all users in a defined workplace area have logged off their computers and associated applications from the application server 120 and, therefore, presumably, will not be using the printer 502 and/or the copier 504 near-term), and may respond thereto by commanding the printer 502 and the copier 504 to change to a lower power sleep state. The centralized controller 510 may send a message to the computer 530 and/or another computer, such as via an e-mail or instant message, to prompt the user to indicate whether the user intends to use one or more of the peripherals 502, 504, and 506, and may control the power state of the peripherals based on the user's response.

The centralized controller 510 may similarly add learned associations and defined rules relating to observing network traffic and associated use of one or more of the peripherals within a threshold time thereof to the database of learned associations and defined rules 580 (e.g., as described above with regard to Blocks 300-304 of FIG. 3) is The wireless terminal proximity unit 576 may be configured in a similar manner to that described above with regard to the wireless terminal proximity unit 176 of FIG. 1 (e.g., as described above with regard to Blocks 212-214 of FIG. 2). Accordingly, the wireless terminal proximity unit 576 may sense that a user has come within a threshold distance of the centralized controller 510 and, therefore, one or more of the peripherals, by discovering that the wireless terminal 194 and/or the computer 530 is now within communication range of the proximity unit 576. The centralized controller 510 may then command one or more of the peripherals 502, 504, and 506 to switch to a higher power operational state in anticipation of receiving one or more commands from the user of the wireless terminal 194 and/or of the computer 530.

The wireless terminal proximity unit 576 may respond to loss of a network connection to the computer 530 and/or the wireless terminal 194 by commanding one or more of the peripherals 502, 504, and 506 to switch to the lower power sleep state (e.g., as described above with regard to Block 404 of FIG. 4).

The wireless terminal proximity unit 576 may associate discovery of the wireless terminal 194 and/or the computer 530 being proximately located to the centralized controller 510 with the use of one or more of the peripherals 502, 504, and 506 within a threshold time of the discovery thereof (e.g., as described above with regard to Blocks 306-308 of FIG. 3). The wireless terminal proximity unit 576 may add the learned association (of discovering a defined wireless terminal/computer and subsequent use of a peripheral) to the database 580 (e.g., as described above with regard to Block 310 of FIG. 3).

The centralized controller 510 may then respond to discovery of a wireless terminal/computer having an identifier that corresponds to an identifier in the database 580 by commanding one or more of the peripherals 502, 504, and 506 to change from the lower power sleep state to the higher power operational state in anticipation of receiving a near-term print command, or another peripheral command, from a user.

The centralized controller 510 may receive information (e.g., from the cellular network operator 198) that is indicative of one or more users being proximately located to one or more of the peripherals 502, 504, and 506, and may respond thereto by commanding the corresponding one or more of the peripherals 502, 504, and 506 to change from the lower power sleep state to the higher power operational state (e.g., as described above with regard to Block 216 of FIG. 2). The centralized controller 510 may similarly respond to information that one or more users are no longer proximately located to one or more of the peripherals 502, 504, and 506 by commanding the corresponding one or more of the peripherals 502, 504, and 506 to change from the higher power operational state to the lower power operational state (e.g., as described above with regard to Block 406 of FIG. 4). The centralized controller 510 may add learned associations between user location information and use of one or more of the peripherals 502, 504, and 506 to the database 580 (e.g., as described above with regard to Blocks 312-314 of FIG. 3).

The schedule unit 578 may operate as described above with regard to the schedule unit 178 of FIG. 1 to control the power state of one or more of the peripherals 502, 504, and 506 according to a schedule that is defined based on the time of day and/or the day of week/month when the power state controller 142 is to control the power state of one or more of the peripherals 502, 504, and 506 to be in the first power state or the second power state. The schedule unit 578 may therefore separately control the power states of the peripherals 502, 504, and 506 according to a defined schedule, and which may be carried out in addition to one or more of the proximity detection functionalities that have been described above with regard to FIGS. 1-5.

Accordingly, the power states of a peripheral device may be controlled based on one or more determinations of whether one or more users are proximately located to the peripheral and have remained proximately located thereto.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of controlling power states of a peripheral device, the method comprising:
   monitoring communications across a network to learn first associations between occurrences of certain traffic on the network and use of the peripheral proximate in time to the occurrences;
   detecting a subsequent occurrence of the certain traffic on the network;
   using the first associations to determine that a user is proximately located to the peripheral responsive to detecting the subsequent occurrence of the certain traffic on the network;
   changing the peripheral from a first lower power state to a second higher power state in response to determining that the user is proximately located to the peripheral;

wherein the network comprises a wireless local area network, and wherein detecting the subsequent occurrence of the certain traffic and using the first associations comprises:
  discovering a wireless communication terminal that is proximate to the peripheral in response to receiving communications across the wireless local area network from the wireless communication terminal; and
  when the peripheral is in the first power state, changing the peripheral to the second power state in response to the discovery of the wireless communication terminal;
learning second associations between discovering a wireless communication terminal having a received identifier and the peripheral receiving an operational command via the network within a threshold time of the discovery;
using the second associations to determine when discovery of a wireless communication terminal having the received identifier is associated with the user of the peripheral; and
when the peripheral is in the first power state, changing the peripheral to the second power state in response to determining that a discovered wireless communication terminal having the received identifier is associated with the user of the peripheral.

2. The method of claim 1, wherein detecting the subsequent occurrence of the certain traffic and using the first associations comprises:
  monitoring communications across the network to detect traffic associated with the user logging onto a computer that can utilize the peripheral and determining that the user is proximately located to the peripheral based thereon; and
  when the peripheral is in the first power state, changing the peripheral to the second power state in response to detecting network traffic associated with the user logging onto the computer.

3. The method of claim 2, further comprising carrying out at the peripheral the monitoring of communication across the network to detect network traffic associated with the user logging onto the computer.

4. The method of claim 3, further comprising communicating a message query from the peripheral to the computer to prompt the user to indicate whether use of the peripheral is planned.

5. The method of claim 2, further comprising:
  in response to detecting network traffic associated with the user logging onto the computer, prompting the user to indicate whether use of the peripheral is planned; and
  in response to the user indicating that use of the peripheral is planned and when the peripheral is in the first power state, changing the peripheral to the second power state.

6. The method of claim 2, further comprising:
  monitoring communications across the network to detect traffic associated with the user logging off the computer; and
  when the peripheral is in the second power state, changing the peripheral to the first power state in response to detecting network traffic associated with the user logging off the computer.

7. The method of claim 1, further comprising:
  providing a database that defines a plurality of users who can use the peripheral;
  monitoring communications across the network to detect traffic associated with users;
  using the database to determine whether the detected traffic is associated with the user of the peripheral; and
  when the peripheral is in the first power state, changing the peripheral to the second power state in response to determining that network traffic is associated with the user of the peripheral.

8. The method of claim 7, further comprising:
  maintaining the database at a centralized peripheral controller that is separate and apart from the peripheral; and
  controlling the power state of one or more peripherals, via a command sent across the network, in response to determining that network traffic is associated with the user of the peripheral.

9. The method of claim 7, further comprising, when the peripheral is in a lower power sleep state, controlling the peripheral to change to a higher power operational state in response to determining that network traffic is associated with the user of the peripheral.

10. The method of claim 1, further comprising, when the peripheral is in the second power state, changing the peripheral to the first power state in response to losing a previously established communication network between the peripheral and the wireless terminal.

11. The method of claim 1, further comprising, when the peripheral is in the second power state, changing the peripheral to the first power state in response to not sensing presence of the wireless terminal within a threshold elapsed time.

12. The method of claim 1, wherein detecting the subsequent occurrence of the certain traffic and using the first associations comprises:
  receiving information from a cellular communication network across the network that indicates that the user of the peripheral is proximately located to the peripheral; and
  when the peripheral is in the first power state, changing the peripheral to the second power state in response to the received information.

13. The method of claim 1, wherein the peripheral comprises a printer configured to selectively operate in a lower power sleep state and a higher power operational state, and wherein the printer switches between the sleep state and the operational state in response to the printer detecting that the user is proximately located to the printer.

14. The method of claim 1, further comprising changing between power states of the peripheral in response to occurrence of a defined time.

15. A peripheral comprising:
  a network interface configured to receive communications across a network;
  a power controller configured to monitor communications across the network to learn associations between occurrences of certain traffic on the network and use of the peripheral proximate in time to the occurrences, detect a subsequent occurrence of the certain traffic on the network, use the learned associations to determine that a user is proximately located to the peripheral responsive to detecting the subsequent occurrence of the certain traffic on the network, and change the peripheral from a first lower power state to a second higher power state in response to determining that the user is proximately located to the peripheral;
  wherein the network interface comprises a wireless local area network transceiver; and
  the power controller is further configured to discover a wireless communication terminal that is proximate to the peripheral in response to receiving communications through the wireless local area network transceiver from the wireless communication terminal, and, when the peripheral is in the first power state, changing the peripheral to the second power state in response to the discovery of the wireless communication terminal, to learn second associations between discovering a wireless communication terminal having a received identifier and the peripheral receiving an operational command via the network within a threshold time of the discovery, to use using the second associations to determine when discovery of a wireless communication terminal having the received identifier is associated with the user of the peripheral, and when the peripheral is in the first power state, to change the peripheral to the second power state in response to determining that a discovered wireless communication terminal having the received identifier is associated with the user of the peripheral.

16. The peripheral of claim 15, wherein the power controller is configured to monitor communications across the network to detect traffic associated with the user logging onto a computer that can utilize the peripheral, and, when the peripheral is in the first power state, to change the peripheral to the second power state in response to detecting network traffic associated with the user logging onto the computer.

17. The method of claim 1, wherein the peripheral comprises one of a plurality of peripherals, wherein each of the plurality of peripherals is configured to perform a different function, and wherein changing the peripheral from the first power state to the second power state comprises:

selectively changing the one of the plurality of peripherals to the second power state and leaving one or more of the plurality of peripherals in the first power state responsive to detecting traffic indicating execution of a particular application program associated with the one of the plurality of peripherals on a computer that can utilize the plurality of peripherals.

* * * * *